(No Model.) 3 Sheets—Sheet 1.
W. DE C. MAY.
APPARATUS FOR ELECTROLYTIC DEPOSITION.

No. 570,133. Patented Oct. 27, 1896.

WITNESSES: INVENTOR (No Model.)

3 Sheets—Sheet 2.

W. DE C. MAY.
APPARATUS FOR ELECTROLYTIC DEPOSITION.

No. 570,133. Patented Oct. 27, 1896.

WITNESSES:

INVENTOR (No Model.) 3 Sheets—Sheet 3.
W. DE C. MAY.
APPARATUS FOR ELECTROLYTIC DEPOSITION.
No. 570,133. Patented Oct. 27, 1896.

WITNESSES: INVENTOR:

UNITED STATES PATENT OFFICE.

WILLIAM DE COURCY MAY, OF NIAGARA FALLS, NEW YORK.

APPARATUS FOR ELECTROLYTIC DEPOSITION.

SPECIFICATION forming part of Letters Patent No. 570,133, dated October 27, 1896.

Application filed September 26, 1894. Serial No. 524,141. (No model.)

*To all whom it may concern:*

Be it known that I, WILLIAM DE COURCY MAY, a citizen of the United States, residing at Niagara Falls, in the State of New York, have invented a certain new and Improved Apparatus for Electrolytic Deposition, whereof the following is a specification, reference being had to the accompanying drawings.

My invention is addressed to the electrolytic treatment of substances in a comparatively fine state of subdivision, and my general object is to quicken and control the process.

Figure 1:
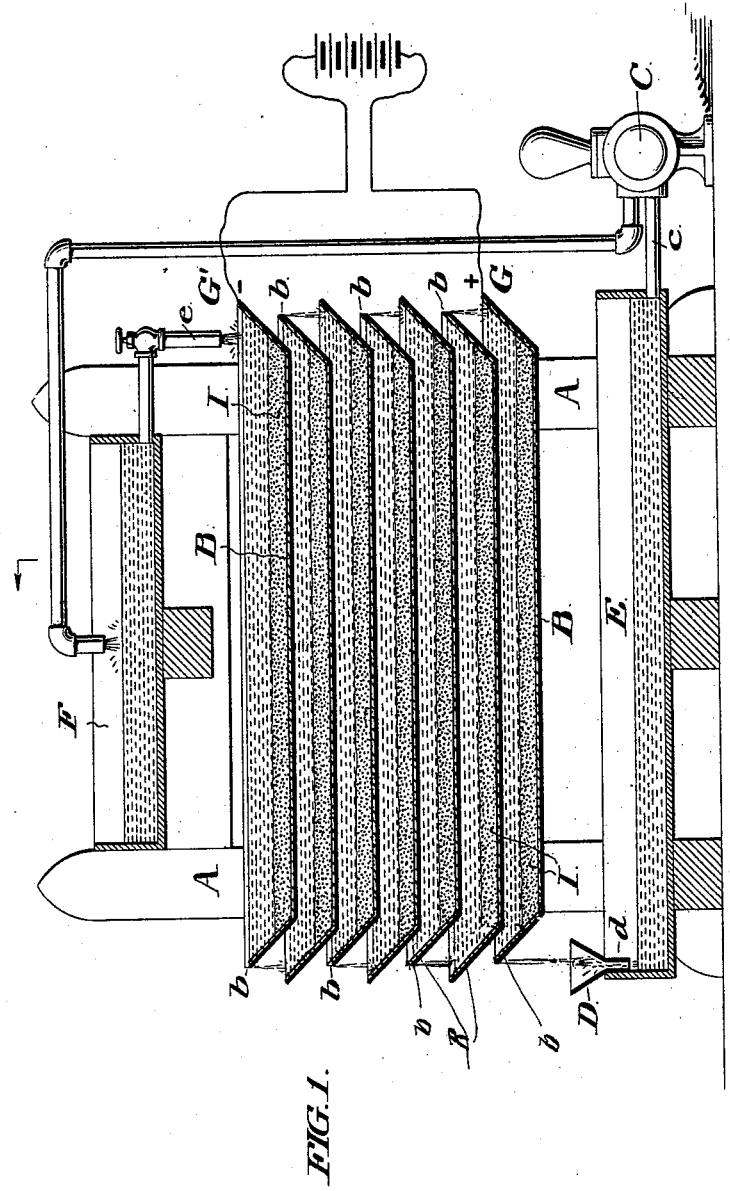
Figure 2:
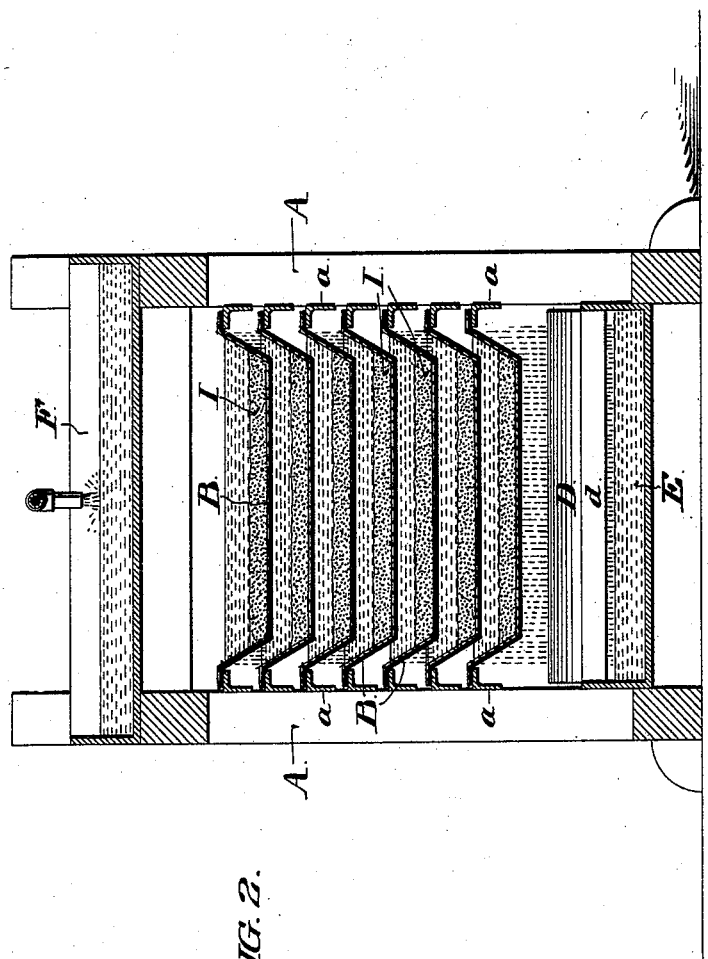
Figure 3:
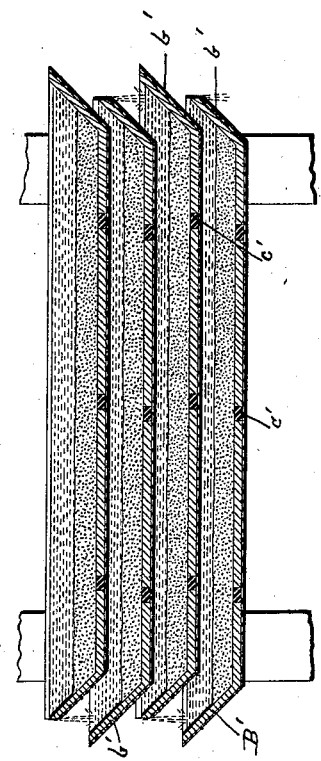

In the accompanying drawings I have represented a typical apparatus embodying my invention, Figure 1 being a longitudinal vertical section, and Fig. 2 a transverse vertical section, through the same. Fig. 3 is a partial sectional view of a modified form of such apparatus.

For convenience of description I will take copper as the typical metal which is to be treated and limit my description, though not my claim, to its employment in this connection.

In Figs. 1 and 2, A indicates a framework carrying a series of shallow copper pans B, made of thin metal and supported, by means of ledges a, upon the framework in such vertical relation to one another as that the bottom of each pan extends down for some distance below the top of the immediately subjacent pan. The pans may be provided with overflow-orifices b to localize the outflow of liquid, and I prefer to locate such orifices at alternate ends of the pans in the series, as indicated. The orifice of the lowest pan delivers into the spout D, whence the pipe d leads to the subsiding-reservoir E. A pump C communicates with said reservoir E by means of the pipe c, said pump being adapted to deliver liquid to a supply-reservoir F, whence a discharge-pipe e is so arranged as to deliver liquid to the topmost pan of the series. The supports for the pans are of such character as to insulate them from one another, and the highest and lowest pans are connected with the terminal wires G G' of a suitable electric circuit adapted to electrical work.

The operation of the apparatus for the conduct of my process is as follows: The copper which is to be deposited, and which consists of a soluble anode, is placed in each pan in the form of shot or fine particles, which have been previously oxidized, the pan being filled therewith to a considerable depth, as indicated at I. The pans are then filled nearly to the top with the electrolyte, so that the bottom of each pan is submerged in the liquid of the pan below. The electric current entering the system by means of the terminal wire G rises and deposits the metallic copper on the bottom of each pan, impoverishment of the electrolyte being prevented by the presence of the soluble anode. A circulation of the electrolyte is maintained by the introduction of liquid from the supply-reservoir F, which causes each pan in the series to overflow into the one beneath it and the final discharge of the surplus into the spout D. The continuous flow of the electrolyte through the system tends to carry off impurities in suspension or solution and thus maintain a condition of maximum efficiency. During the period allowed for subsidence in the reservoir E the liquid may be subjected to any of the ordinary methods of treatment to remove impurities, if desired. The electrolyte is then pumped back to the supply-reservoir F and recommences its flow through the system. After a sufficient quantity has been deposited upon the bottom surfaces of the pans they may be removed and melted together with the deposited copper, a new set of pans being used to replace them. In cases, however, where it is desired to use permanent pans they may be constructed of wood or earthenware, in which case the exterior surface of the bottom of each pan should be coated with conducting material, such as carbon, and means should be provided for maintaining the circuit between such exterior coating and the interior of the pan to which it is applied. In Fig. 3 I have shown a construction adapted to this purpose, B' indicating the earthenware pan, b' the conducting-coating upon the exterior surface of the bottom thereof, and c' the metallic bolts or rivets extending through the non-conducting material of the pan itself and establishing the circuit between its contents and said exterior coating.

I have specified the use of a subsiding-reservoir as an adjunct to the apparatus; but it must be understood that this is not essential, since it may be found convenient in some cases to circulate the electrolyte directly or without affording time for subsidence.

Where other substances than copper are to be treated, it will be understood, of course, that the construction above described is to be modified accordingly.

I do not claim, broadly, the maintenance of the circulation of the electrolyte in a process for the electrodeposition of metal, nor do I claim, broadly, the use of a cathode of similar character to the metal which is to be deposited, the essence of my invention lying in the organized disposition of the series of cathodes and maintenance of the specific direction of travel of the electrolyte.

Having thus described my invention, I claim—

In an apparatus for electrolytic deposition the combination with a suitable source of electricity of a series of receptacles arranged vertically above one another, the bottom of each receptacle extending down into the immediately subjacent one, each of said receptacles being adapted to discharge its overflow into the next of the series; a supply-pipe leading into the first of the receptacles and means, substantially as set forth, whereby the overflow from the last receptacle of the series may be returned to the said supply-pipe, as and for the purposes specified.

WILLIAM DE COURCY MAY.

Witnesses:
FREDERICK CHORMANN,
FRANK A. DEALEY.